ELECTRO-OPTICAL DEVICE HAVING VARIABLE OPTICAL DENSITY

Original Filed Feb. 7, 1967 5 Sheets-Sheet 1

ELECTRO-OPTICAL DEVICE HAVING VARIABLE OPTICAL DENSITY

Original Filed Feb. 7, 1967 5 Sheets-Sheet 3

ELECTRO-OPTICAL DEVICE HAVING VARIABLE OPTICAL DENSITY

Original Filed Feb. 7, 1967 5 Sheets-Sheet 3

ELECTRO-OPTICAL DEVICE HAVING VARIABLE OPTICAL DENSITY

Original Filed Feb. 7, 1967 5 Sheets-Sheet 4

ELECTRO-OPTICAL DEVICE HAVING VARIABLE OPTICAL DENSITY

Original Filed Feb. 7, 1967 5 Sheets-Sheet 5

United States Patent Office

Re. 28,199
Reissued Oct. 15, 1974

28,199

ELECTRO-OPTICAL DEVICE HAVING VARIABLE OPTICAL DENSITY

Satyendra Kumar Deb, Stamford, Conn., and Robert Frank Shaw, Cambridge, England, by American Cyanamid Company, Stamford, Conn., assignee Original No. 3,521,941, dated July 28, 1970, Ser. No. 622,862, Feb. 7, 1967, which is a continuation-in-part of abandoned applications Ser. No. 567,764, July 25, 1966, and Ser. No. 607,116, Dec. 7, 1966. Application for reissue June 1, 1973, Ser. No. 366,233
Int. Cl. G02f *1/28*
U.S. Cl. 350—160 R 24 Claims

Matter enclosed in heavy brackets [ ] appears in the original patent but forms no part of this reissue specification; matter printed in italics indicates the additions made by reissue.

ABSTRACT OF THE DISCLOSURE

Electro-optical device useful in data display, electrophotography, and the like, typically comprising in sandwiched arrangement a pair of transparent electrodes, and a film of a transition metal compound and an insulating film deposed between the electrodes. The device exhibits coloration and bleaching thereof at ambient temperature by control of the polarity of an applied electric field.

This application is a continuation-in-part of applications Ser. No. 567,764, filed July 25, 1966, and Ser. No. 607,116, filed Dec. 7, 1966, both of which are now abandoned.

This invention relates to electro-optical devices and more particularly to devices whose electromagnetic radiation transmission characteristics may be selectively altered by the influence of a suitably controlled electric field.

In prior U.S. applications, Ser. No. 530,086, filed Feb. 25, 1966, and Ser. No. 534,188, filed Mar. 14, 1966, and continuation-in-part applications thereof, there are described electro-optical devices exhibiting a phenomenon known as "persistent electrochromism." This term denotes the property of a material whereby its electromagnetic radiation absorption characteristic is altered, in most instances even at ambient temperature, under the influence of an electric field. Such materials, for example, may exhibit little or no absorption of visible wave lengths in the absence of an electric field and therefore be transparent, but when subjected to an electric field, effectively absorb in the red end of the spectrum, turning blue in color. Similar effects can be observed in other portions of the electromagnetic radiation spectrum, invisible as well as visible.

As described in the foregoing earlier applications, if a layer of a persistent electrochromic material is disposed between a pair of electrodes, across which a potential is applied, the radiation transmitting characteristic of the material will change. If the electrodes and the electrochromic layer are formed on the surface of a transparent substrate, such as glass, the light transmitting characteristics of the combination can be varied by controlling the electric field produced across the electrochromic layer. Thus, if the "sandwich" of electrodes and electrochromic material on the substrate originally is clear, i.e., presenting substantially no diminution of the light transmitting ability of the substrate, application of a voltage between the electrodes to establish an electric field of the proper polarity changes the light absorption characteristic of the electrochromic material, turning it darker for example, thus decreasing the light transmitting ability of the entire assembly.

Although the devices described in the prior applications are effective to change their electromagnetic radiation transmitting properties under the influence of an electric field, the simple sandwiched or layered arrangement of electrodes and layer of electrochromic material is somewhat limited in application because of imperfect reversibility, i.e., the difficulty in returning the device to its initial state and stopping the action at that point without inducing a further color change. Accordingly, although an extremely useful and noval arrangement is described in these earlier applications, its advantages are realizable only in instances where perfect reversibility is not required.

An object of the present invention therefore is to provide an improved form of electrochromic device wherein the change of absorption characteristic is effected rapidly, at low applied potential, and can be reversed perfectly, at will and at a controlled speed.

Briefly stated, the present invention adds to the prior electrode-electrochromic material sandwich, an additional layer between one of the electrodes and the electrochromic material, the additional layer being of a material which can be characterized as a current carrier permeable insulator. It has been found that when such a material is added to the prior device, not only does it permit the absorption characteristic of the electrochromic material to change rapidly under the influence of an electric field of a given polarity, even at ambient temperature, but it also renders the electrochromic layer sensitive to a field of the opposite polarity to return it positively to the absorption characteristic state it occupied prior to the initial application of the field, at a rate dependent upon the magnitude of the reverse field. In certain cases, the return to initial state may be effected at a relatively slow rate simply by providing a highly conductive, e.g., short circuit, path between the two electrodes.

The speeds at which both of the changes can be effected are improved in relation to the transition speed of the embodiments of the earlier applications and the present invention is thus suitable to a much wider range of use. In addition to its applicability to window glass, automobile windshields, and the like, it is capable of being employed effectively in such fields as data display, photography, and others. The field of practical use is widened, moreover by the low power required to induce or erase the new absorption characteristic and the variable speed of the latter function.

The foregoing and other features, objects and advantages of the present invention will become more apparent from the following detailed description thereof taken in conjunction with the accompanying drawings in which.

Figure 1:
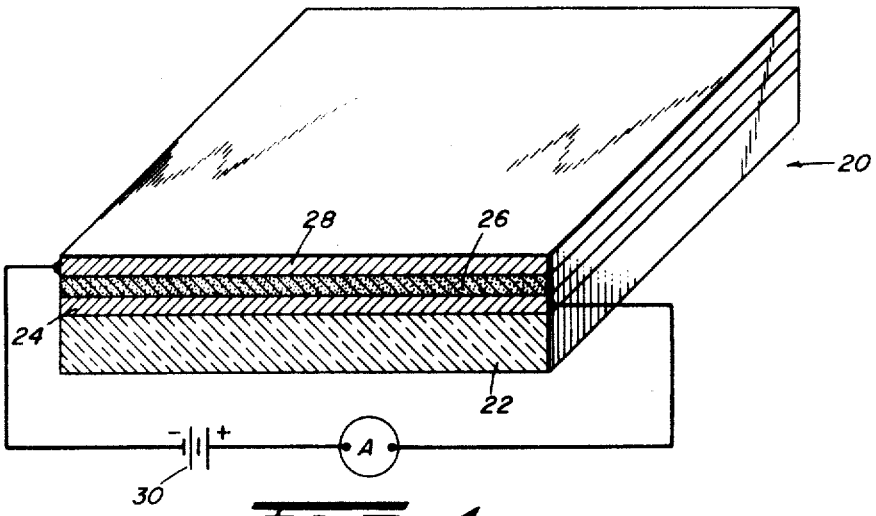
FIG. 1 is an illustration, partly in cross-section, of an electro-optical device of the type described and claimed in the foregoing earlier applications.

In the discussion above, as well as that to follow, the invention is described in terms of its effect on visible light transmission characteristics, i.e., the variation in the wave length absorption of the electrochromic material within the visible region of the spectrum. It will, of course, be recognized that the phenomenon exhibited by the type of materials to be described is not limited to the visible spectrum but may extend into the visible regions.

ELECTROCHROMIC MATERIALS

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

The materials which form the electrochromic materials of the device in general are electrical insulators or semiconductors. Thus are excluded those metals, metal alloys, and other metal-containing compounds which are relatively good electrical conductors.

While not wholly understood, it apears that the materials contain in non-stoichiometric proportions at least two different elements, said elements being present as ions of opposite polarity. This condition produces lattice defects as distinguished from mere physical displacement of crystal symmetry, although the condition may also result in or be evidenced by such. Lattice vacancies are particular instances of lattice defects as, for example, an oxygen vacancy in a metal oxide crystal.

[Two] *The* [classes] *class* of electrochromic materials [may be distinguished] which [satisfy] *satisfies* the foregoing conditions and [are] *is* therefore useful in the present invention. [The first and preferred class (I)] comprises materials disclosed in the above-mentioned prior patent applications. These materials exhibit persistent electrochromism over a wide temperature range including ambient temperature and in some instances high temperatures, e.g., above about 125° C., or low temperatures, e.g., below about −50° C. By "ambient temperature" is meant temperatures normally encountered in the fields of use of the devices such as described hereinafter, e.g., −50° C. to 125° C.

[The second class (II), not included in application Ser. No. 530,086 and its continuation-in-part application, comprises materials which exhibit persistent electrochromism only at relatively high (non-ambient) temperature, e.g., above about 125° C. Examples of these materials are gross crystals or crystalline layers or films of alkali halides such as NaCl, RbCl, KCl, LiF, NaBr, KBr, KI, RbBr, and the like, as described in British Pat. 845,053 and corresponding German Pat. 1,036,388. Combinations of class (I) and class (II) materials may also be employed.]

[The class (I)] *Persistent electrochromic* materials [are further characterized as] *can be found within the class of* inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry," T. Moeller, John Wiley & Sons, Inc., New York, 1952. These include materials containing a transition metal element (including Lanthanide and Actinide series elements); materials containing non-alkali metal elements such as copper, tin and barium; and materials containing an alkali metal element with a variable oxidation state element. Preferred materials [of this class] *forming a subclass within which persistent electrochromic materials can be found* are films of transition metal compounds in which the transition metal may exist in any oxidation state from +2 to +8. Examples of these are: transition metal oxides, transition metal sulfides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups IV–B, V–B and VI–B of the Periodic System, and Lanthanide series metal oxides and sulfides. Examples of such are copper stannate, tungsten oxide, molybdenum oxide, titanium oxide, vanadium oxide, niobium oxide, cerium oxide, cobalt tungstate, metal molybdates, metal titanates, metal nobates, and the like.

The [class (I)] electrochromic materials are distinguished from prior known organic or inorganic materials which exhibit coloration in an electric field as a result of the Franz-Keldysh effect or the effect Platt describes as "electrochromism." As to Platt, see J. Chem. Phys., 34, 862–3 (1961). In the latter cases, coloration results from the shifting of an existing absorption band or spectral line by the electric field, whereas in the present case, an absorption band is created where none existed, upon coloration, or removal upon bleaching.

An important advantage of devices of the invention containing a [class (I)] persistent electrochromic material is [operable] *operability* at ambient temperature. So far as is known, this is the first instance of electrochromic behavior at temperatures of practical application. The invention, therefore, permits numerous practical applications to which prior art electro-optical devices are not susceptible as will be evident from the ensuing description.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compounds being laid down as films and by the film-forming method since the particular compound and film-forming method may place physical (e.g., non-uniform film surface) and economic limitations on manufacture of the devices.

The films may be self-supporting, depending on thickness and film material, or may be laid down on any substrate which, relative to the film, is electrically non-conducting. Suitable substrate materials include glass, wood, paper, plastics, plaster, and the like, including transparent, translucent, opaque or other optical quality materials.

[The preferred electrochromic material for use with the insulating layer is a class (I) material as defined above. However, the performance of class (II) electrochromic materials is also improved since the electrochromic material is made polarity sensitive thereby, that is, responsive to a field of one polarity but not to both at the same time as in the prior art device of British Pat. 845,053.]

Turning now to the drawings, FIG. 1 illustrates a device with the teachings of the above-mentioned prior application Ser. No. 530,086 and the continuation-in-part application thereof. On a substrate 22 such as glass or other transparent material, are successively deposited layers of a conductive material 24, a persistent electrochromic material 26, and a second conductive material 28. At least one of conductive materials 24 and 28 is of optical quality effective for viewing or otherwise sensing the electrochromic change. The substrate 22 and the conductive layer 24 may conveniently be provided as a unit by so-called "NESA" glass, a commercially available product having a transparent coating of conductive tin oxide on one surface of a glass sheet. The layers 26 and 28 may then be deposited on the tin oxide layer by known vacuum deposition techniques. In the prior applications, the persistent electrochromic material is tungsten oxide or molybdenum oxide in the specific examples described and the outer electrode 28 is a gold film. A source of D.C. potential 30 is coupled between the conductive films with its positive terminal on the tin oxide layer and its negative terminal on the gold outer layer.

As described in the earlier application, when the electric field is applied between the electrodes, a blue coloration of the previously transparent sandwich occurs, i.e., the persistent electrochromic layer becomes absorptive of electromagnetic radiation over a band encompassing the red end of the visible spectrum, thereby rendering it bluish in appearance. Prior to the application of the electric field, it was essentially non-absorbent and thus transparent.

As noted briefly hereinabove, although the device of the prior application is quite effective in producing a change in coloration upon application of the electric field, it suffers a shortcoming that restricts its field of use. Specifically, the coloration is irreversible in a practical sense. Moreover, although coloration produced in the device can be removed by reversing the polarity of the electric field, it is not possible to stop the reversal of the phenomenon precisely at the bleached point. This is because, even with dissimilar electrodes, there is a tendency for some coloration to occur near the electrode opposite to the one at which the bleaching takes place. In the case of devices employing thin films of the persistent electrochromic material, the beginning of the recoloration occurs so rapidly that the bleached state may be undetectable by the human eye. Therefore, although bleaching, or erasure, actually does occur in the prior arrangement, it cannot be stopped accurately at the initial condition of transparency.

Figure 2:
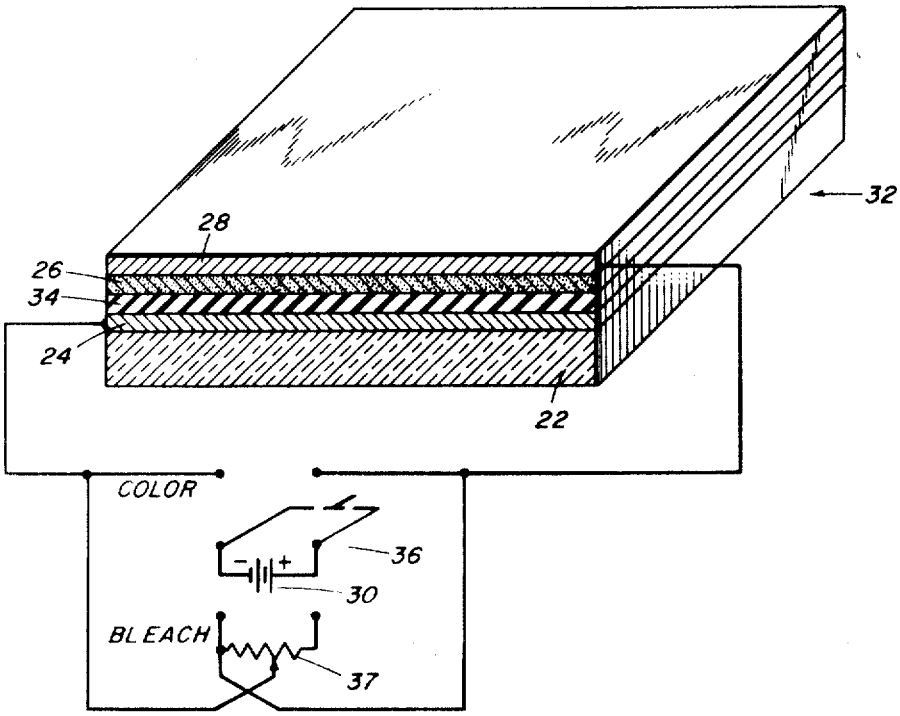
FIG. 2 illustrates, in partial cross section, a device according to the present invention.

These shortcomings are solved by means of the present invention, as illustrated in FIG. 2. The device 32 is of layered or laminar construction as the device 20 of FIG. 1 and includes all of the elements thereof, which are identified by like reference numerals.

INSULATING LAYER

In addition, however, there is inserted between the conductive layer 24 and the persistent electrochromic layer 26, a layer 34 of an insulating material. The layer 34 may be defined as a "current carrier permeable insulator" and as used herein is intended to denote any material of electrical resistivity sufficient to provide continuous effective insulation against normal electrical conducton between opposed surfaces of the electrodes. Numerous well-known materials are suitable for use as current carrier permeable insulators in this invention. These [include] *can be found in a class including* an air gap or vacuum gap; normally substantially non-conductive substances such as plastics, e.g., polyesters, vinyl or like polymers, allylic or like polymers, polycarbonates, phenolics, amino resins, polyamides, polyimides, cellulosic resins, and others whether solvent or water soluble or insoluble. Also included are metal oxides or sulfides prepared by oxidizing or sulfidizing a metal electrode surface such that the insulator is formed directly on the electrode. An example is the combination of an aluminum electrode and aluminum oxide insulator coating. Other such inorganic insulators contemplated are selenide, arsenide, nitride, chloride, fluoride, bromide and carbide films.

Where practicable and compatible with the electromagnetic material and electrodes, the insulator may be a fluid (liquid or gas), low melting solid, or solid or liquid mixture of two or more different insulating materials.

Three suitable insulators are silicon oxide, calcium fluoride and magnesium fluoride.

Preferably the insulator is a film of at least about 0.001 micron thickness, for example, in the range of about 0.001–1.0 micron.

The normal stoichiometric relationship in the compounds which serve as persistent electrochromic materials or as insulators has not been indicated herein, e.g., tungsten dioxide rather than tungsten oxide or silicon monoxide rather than silicon oxide, since the materials are intended to include not only compounds in which stoichiometry obtains but also compounds in which the relationship of atoms of the elements is not precisely stoichiometric, it being understood that the materials are more precisely defined by the characteristics herein described.

The mechanism by which the current carrier permeable insulator improves the performance of the persistant electrochromic material can be understood as a selective introduction of charge carriers (i.e., electrons, holes, positive or negative ions) suitable for the subsequent production of persistent coloration in the electrochromic material. The current carrier permeable insulator thereby renders the electrochromic material polarity sensitive, with the result that application of a voltage of polarity opposite that which produces coloration will result in bleaching without simultaneous recoloration.

This general mechanism may be viewed more particularly as two cases or theories, electronic and ionic. Each case explains certain observations not adequately explained by the other case, and it is not altogether implausible that the mechanisms may operate simultaneously although independently.

In a first or electronic case, the current carrier permeable insulator functions by non-classical transposition (tunneling) of electrons or holes through the energy barrier junction between the insulator and the persistent electrochromic material. An equivalent characterization of such insulator materials in this view is that they exhibit an energy gap between their valence and conduction bands of width sufficient at the temperature of use to impede normal electrical conduction through the material of the insulator but nevertheless, because of their thinness, permit quantum mechanical tunneling of current carriers, i.e., electrons or holes. The current carriers which are injected by the tunneling process through the insulator into the persistant electrochromic material possess sufficient energy to become trapped in the energy level sites which produce the color centers observed as the coloration of the persistent electrochromic material. In order to maintain approximate charge neutrality in the persistant electrochromic layer, carriers of sign opposite to that of carriers which tunnel through the insulating layer must enter from the electrode opposite the electrode adjacent the insulating layer. During bleaching, either by short-circuiting or by imposition of a voltage opposite that of the voltage which produces coloration, the charge carriers are removed or permitted to recombine through the external circuit, emptying the carriers from their traps and thus restoring the color centers to their original colorless condition. Coloration cannot occur under the condition of reverse voltage because the current carrier permeable insulator is not adjacent the electrode of polarity suitable for the tunneling and injection phenomenon.

Alternativeliy, as a second case, the current carrier permeable insulator can serve to block entirely the passage of an electronic current (i.e., electrons or holes) but permit the transfer through it of ions. In such case, the insulator serves to facilitate the production of color centers in the persistent electrochromic layer by providing a large electric field gradient through which ions may move rapidly, even at ambient temperature, to be removed or added to the persistent electrochromic material. In this situation, the insulator layer can also serve as a temporary or permanent repository for ions removed from the electrochromic layer.

Whether or not these theories are ultimately proven to govern in the present invention, the devices described herein achieve the coloration and bleaching capabilities indicated.

As indicated above, the addition of the insulator to the prior art arrangement permits the device to function effectively in a reversible manner. For this purpose, in FIG. 2, the battery 30 is coupled to the electrode 24 and 28 through a reversing switch indicated generally at 36. As shown, with the switch arm in the position to produce coloration, the positive terminal of the source is connected to the outer or gold electrode while the negative terminal is connected to the tin oxide layer on the glass substrate. This, it will be noted, is opposite to the connections in the prior device as shown in FIG. 1.

Once complete coloration is induced, which in a typical case is a matter of seconds, the switch 36 may be opened, disconnecting the battery from the device entirely, and the device will remain in its darkened state without further application of power.

To bleach or erase a previously darkened surface, the switch arm is thrown to the "bleach" contacts, across which is connected a potentiometer 37. As shown, the potentiometer contact or slider is movable from a point at which the electrodes 24, 28 are short circuited to a point at which full battery voltage, of polarity opposite to the coloration condition, is applied between them. Any number of reverse voltage values may be obtained between the two extremes.

In the position illustrated in the drawing, a "bleach" voltage of a value less than battery voltage is applied across the electrodes, setting up a corresponding electric field. Under the influence of this field, the device returns to its initial uncolored state. The rapidity with which the bleaching occurs is determined by the magnitude of the voltage; the higher the voltage, the faster the bleaching process is completed. At the higher bleaching voltages, it has been found that the bleaching process is even faster than the coloring operation. Once the bleaching is completed, no further coloration is observed with this polarity and the switch may be opened to disconnect the battery from the device and minimize power drain.

It has also been found that, notwithstanding the absence of an electric field, when the potentiometer is in its short circuiting position, certain of the persistent electrochromic materials nevertheless will return completely and positively to the initial state. The rate at which the bleaching occurs, however, is somewhat slower than when the material is subjected to an electric field.

ELECTRODES

Virtually any material exhibiting electrical conductivity may be used for an electrode. The same material may be used for both electrodes or each electrode may be of a different material, or mixtures or alloys of different materials. Typical electrode materials are the metals, e.g., gold, silver, aluminum, and conducting non-metals such as carbon, suitably doped tin or indium oxide, and the like. As already indicated, at least one of the electrodes should be of an optical quality effective for transmission of the electrochromic change if in the visible or for instrumentally sensing the change if not in the visible range.

The negative and positive electrodes need only be in electrical contact with the film. Any type and arrangement of electrodes and film effective to impose an electric field on the film when the electrodes are connected to a voltage source, will be suitable. Thus, the electrodes may be spaced conducting strips deposited on or imbedded in the film or they may be conducting layers between which the film is inserted.

As will be apparent from the specific examples to be described below, many combinations of persistent electrochromic materials, insulating materials and electrode materials may be employed in accordance with the present invention. While the following examples describe devices incorporating class (I) electrochromic materials, it should be understood that where high temperature use is contemplated, class (II) electrochromic materials may be employed.

EXAMPLE I

A film of molybdenum oxide, about 1.0 micron in thickness, is thermally evaporated by conventional means at a pressure of $10^{-5}$ torr from an electrically heated tantalum boat onto the tin oxide coated side of "NESA" glass, the tin oxide on the glass forming the first electrode. A very thin film of silicon oxide, an insulating material, about 200 angstroms thick, is then deposited in like manner onto the molybdenum oxide layer. Finally, a thin film of gold, about 100 angstroms thick, effectively transparent, is deposited over the silicon oxide insulating layer to form the second electrode of the layered structure or sandwich.

During the several stages of evaporation, appropriate masking is effected to expose a portion of the tin oxide layer for attachment of the conductor, and also to extend the gold layer so that a portion of it is directly on an uncoated portion of the glass substrate, minimizing the danger of shorting through to the tin oxide layer when the conductor is attached to the gold electrode. Attachment of the electrode leads is facilitated by first painting the desired electrode area with a conductive silver paint and, after the paint has dried, attaching the wires with indium solder.

When an electric field of from 5 to 7 volts is applied across the foregoing sandwich structure with the gold layer as the positive electrode and the tin oxide as the negative electrode, the molybdenum oxide film, normally colorless, is colored blue uniformly over the entire surface, reducing the light transmission of the sandwich to about 10% in 30 seconds. The coloration remains substantially permanent when the electric field is removed.

Once colored, an application of an electric field of reverse polarity, i.e., positive potential on the tin oxide layer and negative potential on the gold layer, the coloration fades uniformly and completely to restore the initial light transmission of the sandwich. This occurs somewhat faster than the coloration, taking about 6 to 15 seconds, but can be varied by changing the value of potential.

EXAMPLE 2

The device is fabricated as described in connection with Example 1 except that a film of tungsten oxide is substituted for the molybdenum oxide. Application of 2 to 3 volts between the electrodes, with the gold electrode positive, reduces the light transmission of the device to 4% in about 2 minutes. Reversal of the polarity for approximately 15 seconds restores the full light transmission capability. It has been found that with the tungsten oxide film, bleaching also occurs, but more slowly, when the electrodes are short circuited. A very gradual, i.e., over a span of several hours, bleaching occurs also with the field removed and the electrodes open circuited.

EXAMPLES 3–12

Table I below illustrates other combinations of persistent electrochromic materials and insulating materials which when supported as films between electrode materials substantially as described in Examples 1 and 2 exhibit the radiation transmission characteristics of the invention.

TABLE I

| Example | Electrochromic material | Insulating material |
|---|---|---|
| 3 | Tungsten oxide | Calcium fluoride. |
| 4 | Molybdenum oxide | Do. |
| 5 | Copper stannate | Do. |
| 6 | Niobium oxide | Silicon oxide. |
| 7 | Vanadium oxide | Do. |
| 8 | Cobalt tungstate | Do. |
| 9 | Copper stannate | Do. |
| 10 | Tungsten oxide | Magnesium fluoride. |
| 11 | Molybdenum oxide | Do. |
| 12 | Copper stannate | Do. |

Other combinations of the materials discussed above may be employed to vary the final characteristics of the overall device, i.e., the percentage change in light transmission capability, the voltage required to establish the requisite field strength, the time for the change to occur, etc. The depth of coloration is also dependent upon the thickness of the persistent electrochromic layer. In theory, it would seem that the thicker the layer the more color centers would be formed upon application of the electric field and therefore deeper coloration could be expected. However, since thin layers could be expected to color more quickly in some cases, the relationship between thickness of the layers and depth of color is not simple.

At present, the theory behind the coloration and bleaching effects obtained with the present invention is not fully understood. However, certain features of the behavior of the devices of this invention will be described. It will be appreciated, of course, that the ensuing discussion reflects the present thinking of the inventors and it is not intended to be limiting.

Figure 3:
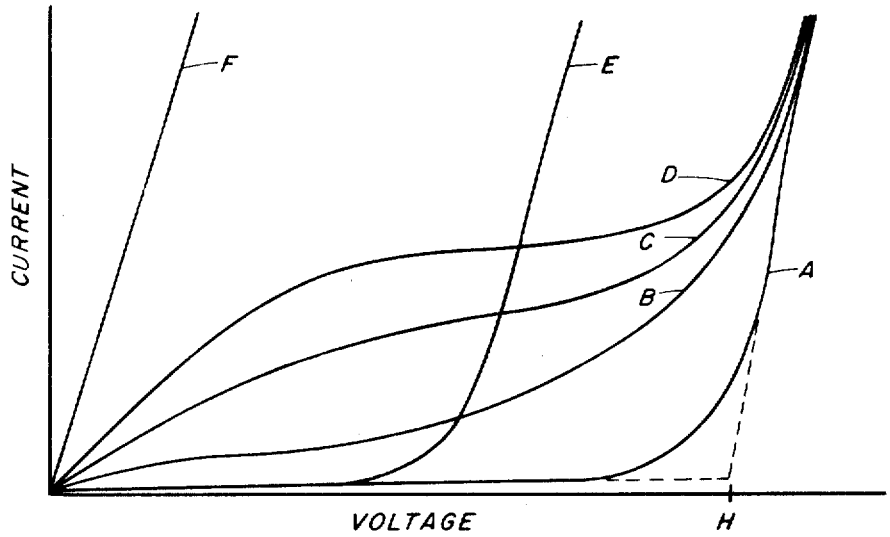
FIGS. 3 and 4 are charts helpful in understanding the operation of the present invention.

Referring to FIG. 3, there is illustrated a current vs. voltage plot for the device shown in FIG. 1. It is obvious that application of a voltage to the device can produce a change in coloration which may in turn result in a change of electrical properties, so that appropriate precautions were taken in order to reduce inaccuracies from this cause to a minimum. If the measurements are made too slowly, excessive coloration changes may influence the result; if the measurements are made too rapidly, capacitance effects, due to the electrode configuration, may influence the result. Curve A is that obtained with the structure of FIG. 1 prior to any coloration, while curves B, C and D are those obtained with progressively greater coloration, i.e., length of time of applied field. Curve E represents the current-voltage relationship when the polarity of the applied voltage is reversed before coloration is induced. Extrapolating the right hand linear part of curve A to zero current, assuming the last part (dotted line) is due to a voltage independent series resistance, suggests a threshold energy H (electron volts). As can be seen from the curves B, C and D in FIG. 3, the current-voltage relationship becomes increasingly perturbed during the coloration process. This observation can be explained as the result of increased conductivity of the persistent electrochromic material in the colored state. Curve F is the curve obtained when the polarity is reversed after coloration. Comparison of the curves F and E, which are obtained after and before coloration, respectively, indicates again the increase of conductivity of the colored electrochromic material. It is clear from FIG. 3, therefore, that the voltage H is a critical voltage, threshold voltage, which must be equaled or exceeded in order to obtain sufficient coloration in the arrangement of FIG. 1.

The curves of FIG. 3 suggest that with the type of device shown in FIG. 1, the attainment of the threshold voltage requires increased applied voltage with time, thereby slowing down the coloration and at the same time increasing the current required by the device at a given voltage. It is therefore postulated that an unaffected threshold voltage would favor coloration.

Figure 4:
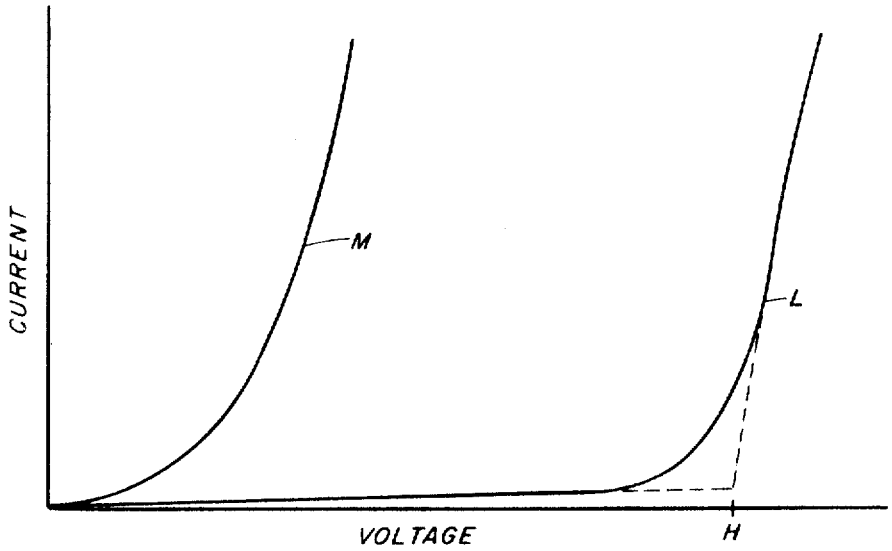

FIG. 4 shows comparable curves representing the coloration and bleaching modes for the device of the present invention shown in FIG. 2. As can be seen by comparing FIGS. 3 and 4, the shape of curve L does not change during the coloration process. Stated otherwise, curve L is a composite of curves A to D of FIG. 3, and demonstrates that the addition of the insulating layer does not affect the threshold voltage, H, and also prevents the conductivity increase with coloration of the device of FIG. 1, thereby giving rise to a more intense coloration at a given applied voltage. The curve M represents the current-voltage behavior during the bleaching process.

Although not apparent from the curves, in both coloration and bleaching the energy requirements of the device of FIG. 2 are considerably less than those of the device of FIG. 1.

The effect of adding the insulator to the device is not only to maintain the threshold voltage favorable to the coloration process but also to provide the selectivity for current carriers and the polarity sensitivity which were mentioned in connection with previous discussion of the charge carrier permeable insulating layer.

It should be emphasized that the diagrams of FIGS. 3 and 4 and the foregoing analysis presents only what is thought to be the mechanism responsible for the uniformly induced coloration and rapid and complete bleaching achieved in accordance with the invention. Whether or not these theories are ultimately proven to govern in the present case, the device described herein achieves the coloration and bleaching capabilities indicated.

As mentioned above, in addition to the insertion of an insulating layer, the device of FIG. 2 differs from that of FIG. 1 in that the tin oxide is made the negative electrode and the gold the positive electrode. The reason for the electrode reversal is that the presence of the insulating layer makes electron injection more favorable when the tin oxide is negative. It will be appreciated that the polarity of the electrodes will depend upon the type of current carrier involved in the coloration process.

As will be appreciated, the principle of the invention as embodied in the arrangement of FIG. 2 lends itself to many and varied applications. The controlled coloration achieved by removing the field when the required color is obtained, makes it extremely desirable for use in windows, automobile windshields, skylights, etc., where total light transmitting capability is desired at times and a limited light transmission wanted at other times, such as in direct sunlight. This flexibility is enhanced by the controllable bleaching capability of the device. Many other feasible applications exist and several of these are illustrated in FIGS. 5–8.

Figure 5:
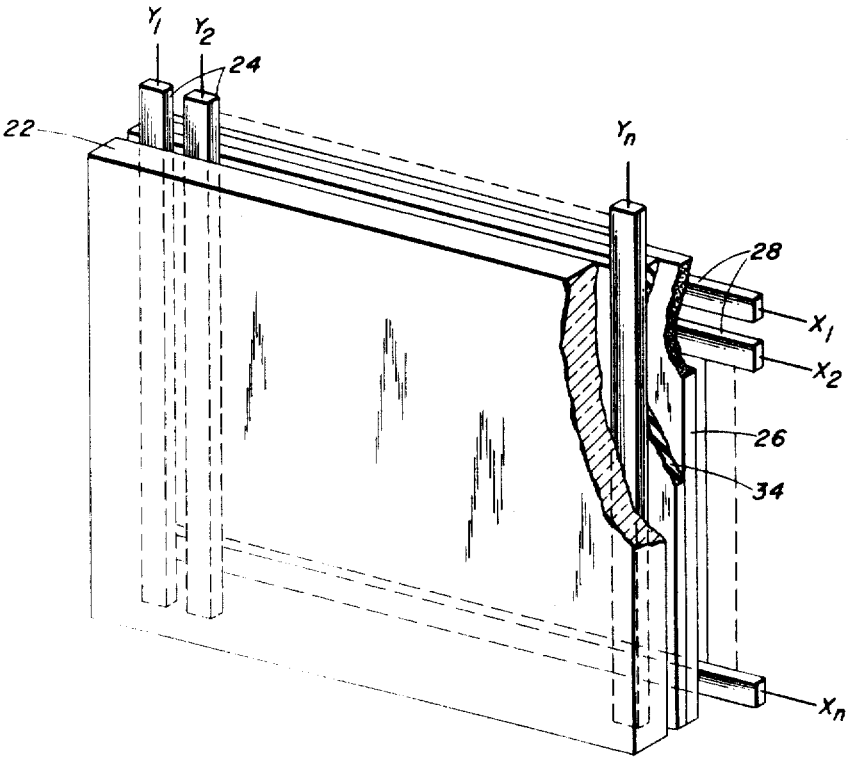
FIG. 5 illustrates a modification of the present invention wherein the electrodes are in the form of orthogonally related narrow strips.

In FIG. 5, the electrode 24 (FIG. 2) is replaced with a number of electrode strips $Y_1 \ldots Y_n$, extending between the substrate 22 and the insulating layer 34 and spaced from each other, while the electrode 28 is similarly formed of a plurality of strips, $X_1 \ldots X_n$, orthogonally related to the electrodes $Y_1 \ldots Y_n$. Application of a proper voltage between electrodes $Y_1$ and $X_1$ for example, will produce a coloration only at the area of their intersection, as shown in the drawing. This permits selective coloration of various portions of the surface, dictated by the voltage connections made to the individual electrodes. If the electrodes are made extremely narrow, e.g., of very fine wires, and closely spaced, it will be possible to produce a high-resolution image on the surface. This capability lends the arrangement to a wide variety of uses in the display field. For visualization, as least one of the electrode series $Y_1 \ldots Y_n$ and $X_1 \ldots X_n$ will be of optical quality, e.g., transparent, although instrumental sensing means will also be effective in applications where the electrodes are not of optical quality.

Figure 6:
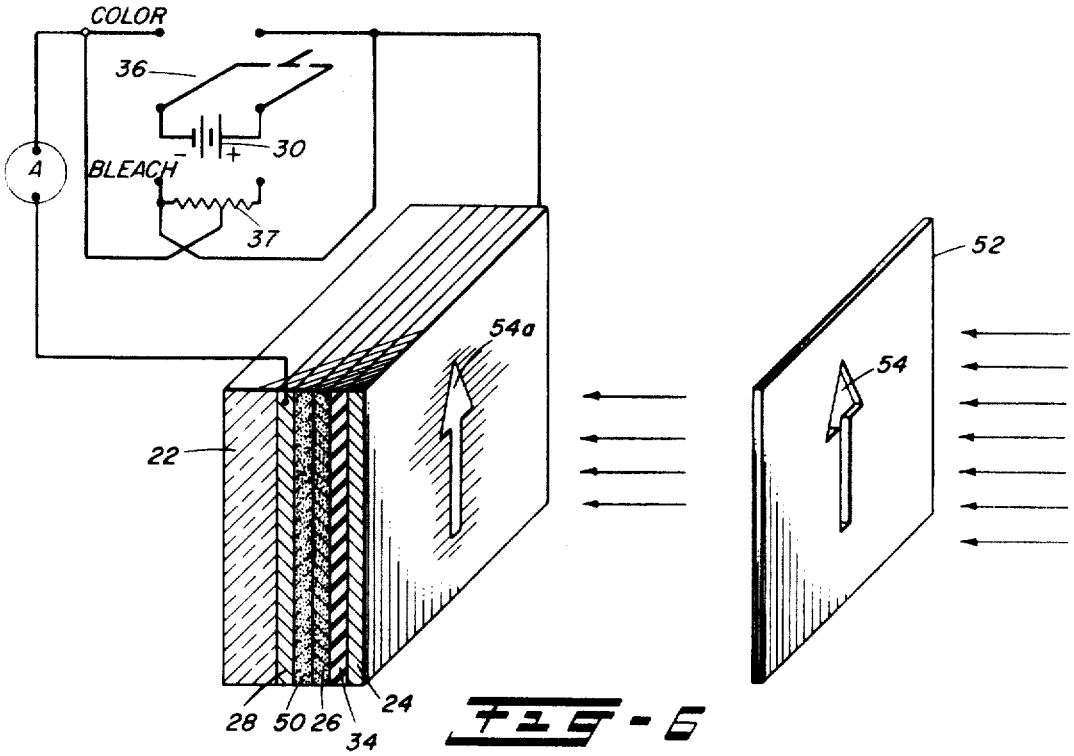
FIG. 6 illustrates a modification of the present invention in which the device is both photo responsive and electric field responsive.

FIG. 6 is a modification of the present invention whereby it is rendered photosensitive as well as electrically sensitive, in the manner taught in the prior application Ser. No. 534,188 and the continuation-in-part application thereof. A photoconductive layer 50 is applied between the electrode 28 and the electrochromic layer 26, with the substrate 22 being adjacent the electrode 28. Alternatively, layer 50 may be adjacent electrode 24 (between 34 and 24) or between layers 26 and 34. The usual activating voltage is applied via the switch 36 to the electrodes, but is of a magnitude such that the electric field is insufficient to initiate the coloration process in the absence of light. Potentiometer 37, as already described with reference to FIG. 2, provides a convenient means for variable voltage control.

If light is transmitted through the light-pervious portion 54 of the image plate 52 so as to produce an image 54a on the surface of the device, it will cause the photoconductive layer, which conveniently may be of a material such as cadmium sulfide, to become more conducting and increase the field across the electrochromic layer. The increased field thus established across the electrochromic layer is sufficient to effect coloration over an area conforming to the image 54a and the device becomes photoresponsive, e.g., a camera.

The addition of the insulating layer in accordance with the present invention noticeably improves the response of the device disclosed in the prior application in that the exposure time necessary to produce an image is shortened.

Further, the reversibility feature provided by the present invention allows either a positive or negative exposure to be produced. If the device is normally in its transparent state, the appropriate voltage will produce a coloration in the exposed area, providing a positive. If the device is initially uniformly colored, such as by applying the proper potential while the entire surface is exposed to light, subsequent exposure when made with the voltage across the electrodes reversed, will result in bleaching of the exposed area, thus providing a negative suitable for printing, etc. The value of the bleach voltage can be varied to obtain a wide variety of effects.

For certain applications such as radiophotography, an ionizing radiation conductive material may be substituted for the photoconductive material.

Figure 7:
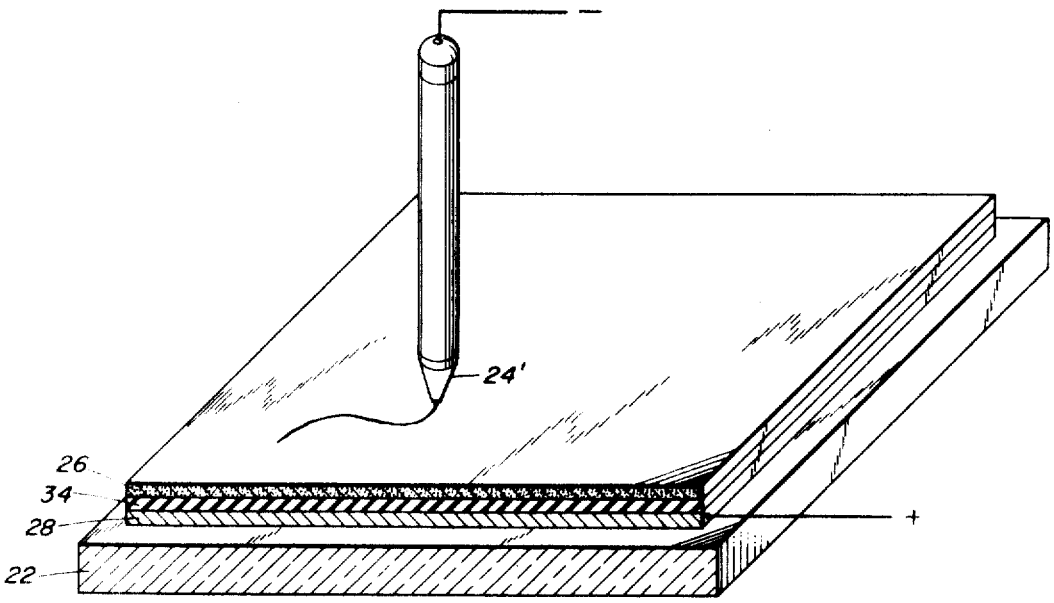
FIG. 7 illustrates a further embodiment of the invention wherein one of the electrodes is in the form of a movable probe.

FIG. 7 illustrates a further application wherein the electrode 24 is in the form of a movable probe 24' having a relatively small area rounded tip. With the voltages applied as shown, the probe functions as a stylus, coloring the surface only at the point of contact with an intensity dependent upon current flow. Such a device can be useful in information storage and transmission. The writing can be effected with an electronic beam, such as in a cathode ray tube, instead of a stylus. Erasure can be effected by rubbing a relatively broad area electrode across the surface with the potenteials suitably reversed.

Figure 8:
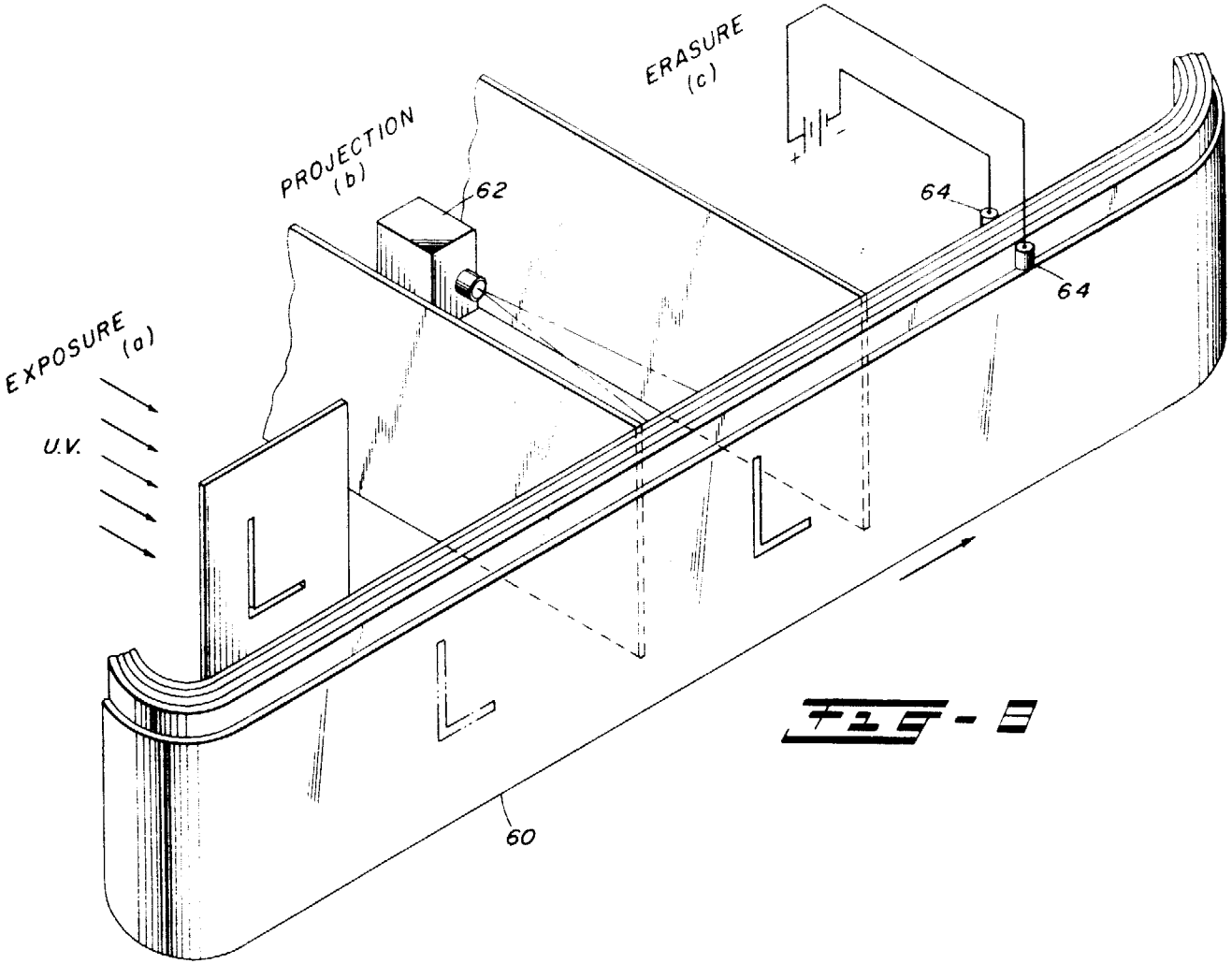
FIG. 8 illustrates the present invention as applied to a rapidly changing data display system.

FIG. 8 shows another application to which the present invention lends itself, in this case for presentation of continuously changing data such as a stock ticker display. Here, the device is produced by depositing the requisite layers on an endless strip of a transparent flexible carrier 60, such as a plastic tape. Since many of the persistent electrochromic materials suitable for use in the present invention also exhibit the property of photochromism under ultra violet light, as discussed in the aforementioned prior applications, a character or figure may be visibly produced on the tape by exposure under ultra violet light, such as shown at station a.

As the exposed portion of the tape leaves the exposure area, it moves into a projection area b where it is projected by an incandescent light source 62 onto a viewing screen (not shown). After projection, it moves into an erasure area c, wherein a localized erasing field is established by means of wipers 64 which contact the electrode layers along exposed narrow surface at the upper edge and establish the field of proper polarity between them. The tape portion is thus erased and returns to the exposure area a for reuse.

In the foregoing discussion, the visual effects obtainable with the present invention have been described and stressed. However, the present device exhibits other characteristics, not visible to the eye, which are of considerable interest. Firstly, the conductivity of the persistent electrochromic film changes concurrently with the degree of coloration. The uncolored film is a relatively good electrical insulator, whereas the colored film is a relatively good electrical conductor. This conductivity change reverses upon erasure of coloration and thus the device functions as a variable resistor which can occupy different stable resistance states. Advantages of this phenomenon may be taken in such areas as information storage.

Additionally, there is a change iin dielectric constant of the persistent electrochromic film and hence the device may also be used as a voltage variable capacitor. These capacitance variations differ greatly from those obtained with conventional s-n junction type voltage variable capacitors. In the latter devices, the capacity variations exist only during the application of the electric field and disappear upon removal of the field. In the present invention, the capacitance change once induced by application of a field, remains until removed or reduced by application of a reverse polarity field or short circuiting of the electrodes.

In the examples discussed above, steady state direct current sources have been shown for establishing the necessary electric fields. A series of short duration, high intensity pulses can also produce the coloration and bleaching effects and in general, the duration and magnitude of the applied voltage will control the depth of coloration and extent of bleaching.

It will be appreciated also that the layers of electrochromic and insulating materials may be interchanged with respect to the electrodes, with an appropriate change in voltage polarities, and the same results achieved. In the embodiment of FIG. 8, the order in which the layers are formed on the substrate may be interchanged, along with appropriate voltage polarity changes, without destroying its function.

It will be seen that the principles of the present invention are capable of many and varied applications and modifications and it is intended that the scope of the invention be limited only in accordance with the appended claims.

The subject matter of prior U.S. patent applications Ser. Nos. 530,086, filed Feb. 25, 1966, and 534,188, filed Mar. 14, 1966, and the continuation-in-part applications thereof Ser. No. 616,791 filed Feb. 17, 1967, and Ser. No. 616,790, filed Feb. 17, 1967, are incorporated herein by reference.

We claim:

1. A device having an electric field responsive radiation transmitting characteristic comprising a solid persistent electrochromic material and a current carrier permeable insulator.

2. The device of claim 1 wherein said electrochromic material is effective at ambient temperature.

3. A device having an electric field responsive radiation transmitting characteristic comprising a pair of electrodes, a solid persistent electrochromic material in contact with one of said electrodes, and an insulating material in contact with said persistent electrochromic material and the other of said electrodes.

4. The device of claim 3 wherein said electrochromic material is effective at ambient temperature.

5. The device of claim 3 wherein said persistent electrochromic material and said insulating material are in relatively thin layers.

6. The device of claim 5 wherein said electrodes are also in relatively thin layers to form a sandwich-like structure.

7. A device having an electric field responsive transmitting characteristic comprising a sandwich type structure of a pair of electrodes, a layer of a persistent electrochromic material in contact with one of said electrodes, said electrochromic layer being effective at ambient temperature and from about 0.1 to 100 microns in thickness, and a layer of an insulating material in contact with said electrochromic material and the other of said electrodes, said insulating material being from about 0.001 to 1.0 micron in thickness.

8. The device of claim [7] *3* wherein at least one of said electrodes is substantially transparent.

9. The device of claim [7] *1* wherein said insulating material is a member selected from the group consisting of silicon monoxide, calcium fluoride and magnesium fluoride and said persistent electrochromic material is a member selected from the group consisting of a metal stannate; an oxide of a metal of Groups IV–B, V–B, and VI–B; and a Lanthanide series metal oxide.

10. The device of claim [9] *1* wherein said persistent electrochromic material is tungsten oxide.

11. The device of claim [9] *1* wherein said persistent electrochromic material is molybdenum oxide.

12. The device of claim [9] *1* wherein said persistent electrochromic material is niobium oxide.

13. The device of claim [9] *1* wherein said persistent electrochromic material is vanadium oxide.

14. The device of claim [9] *1* wherein said persistent electrochromic material is cobalt tungstate.

15. The device of claim [7] *3* further comprising a photoconductive material or ionizing radiation conductive material between said electrodes.

16. The device of claim 15 wherein said photoconductive material is cadmium sulfide.

17. A variable light transmitting device comprising a supporting substrate of a material having a given light transmitting characteristic, on one surface of said substrate a coating comprising first and second layers of conductive material and respective layers of a solid persistent electrochromic material and a current carrier permeable insulating material between said first and second conductive layers, and means to apply a voltage between said first and second conductive layers to establish an electric field, said coating being responsive to an applied voltage of one polarity to alter the given light transmitting characteristic of said device from said given value to a second value, and responsive to an applied voltage of opposite polarity to return the light transmitting characteristic of said device from said second value to said given value.

18. The device of claim 17 wherein each of said conductive layers is in the form of a plurality of strips of conductive material, the strips in the respective layers being orthogonally related to each other.

19. The device of claim 17 in which said coating is also responsive to an effective short circuit between said first and second conductive layers to return the light transmitting characteristic of said device from said second value to said given value.

20. A variable light transmitting system comprising a device having a pair of conductive electrodes, a solid persistent electrochromic material and an insulating material disposed between said electrodes, and a control means coupled to said electrodes for selectively applying across said electrodes a potential of one polarity, a potential of the opposite polarity, and an effective short circuit.

21. The system of claim 20 wherein at least one of the selectively applied potentials is variable over a given range.

22. A variable light transmitting device comprising a supporting substrate having a given light transmitting characteristic, a layer of a conductive material on said substrate, a layer of a current carrier permeable insulating material on said conductive material, a solid, persistent electrochromic material on said insulating material, and a movable conductive probe capable of making a small area contact with said persistent electrochromic material.

*23. A device having an electric field responsive radiation absorptive characteristic comprising:*

*means for applying a first electric field having a first polarity, for removing the first electric field, for applying a second electric field having a second polarity opposite the first polarity, and for removing the second electric field;*

*radiation absorptive means disposed within said fields and comprising a solid persistent electrochromic material effective at ambient temperature for producing a radiation absorptive characteristic that is altered from a first state to a second state during the application of the first electric field, and that persists in the second state after the first electric field is removed; and*

*current carrier permeable insulator means cooperating with the electrochromic material for enabling the absorptive characteristic to be returned from the second state to the first state and to be maintained in the first state during the application of the second electric field and to persist in the first state after the second electric field is removed.*

*24. A device having an electric field responsive radiation absorptive characteristic comprising:*

*a first electrode;*

*a second electrode spaced from the first electrode;*

*means for applying a DC voltage across the first and second electrodes, for removing the voltage from at least one of the electrodes and for connecting a conductive path between the first and second electrodes;*

*radiation absorptive means disposed between the first and second electrodes comprising a solid persistent electrochromic material effective at ambient temperature for producing a radiation absorptive characteristic that is altered from a first state to a second state during the application of the voltage across the first and second electrodes and that persists in the second state after the voltage is removed; and*

*current carrier permeable insulator means cooperating with the electrochromic material for enabling the absorptive characteristic to be returned from the second state to be first state and to be maintained in the first state while the conductive path is connected between the first and second electrodes.*

References Cited

The following references, cited by the Examiner, are of record in the patented file of this patent or the original patent.

UNITED STATES PATENTS

| | | | |
|---|---|---|---|
| 3,535,022 | 10/1970 | Duchateau et al. | 350—160 R |
| 2,632,045 | 3/1953 | Sziklai | 178—5.4 |
| 2,897,399 | 7/1959 | Garwin et al. | 315—10 |
| 3,054,900 | 9/1962 | Orthuber | 250—213 |
| 3,282,157 | 11/1966 | Jones et al. | 88—107 |
| 3,341,826 | 9/1967 | Lee | 340—173 |
| 3,317,266 | 5/1967 | Heller et al. | 350—160 |

RONALD L. WIBERT, Primary Examiner

P. K. GODWIN, Assistant Examiner

U.S. Cl. X.R.

340—335